US006566410B1

(12) United States Patent
Zaki et al.

(10) Patent No.: US 6,566,410 B1
(45) Date of Patent: May 20, 2003

(54) METHODS OF DEMULSIFYING EMULSIONS USING CARBON DIOXIDE

(75) Inventors: Nael Naguib Zaki, Raleigh, NC (US); Peter Kelley Kilpatrick, Cary, NC (US); Ruben Guillermo Carbonell, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 132 days.

(21) Appl. No.: 09/598,863

(22) Filed: Jun. 21, 2000

(51) Int. Cl.$^7$ ............................. B01D 17/04; C07C 7/10
(52) U.S. Cl. ...................... 516/135; 516/138; 516/194; 208/45; 208/188; 210/708; 585/812; 585/838; 507/921
(58) Field of Search ................................ 516/113, 135, 516/138, 194; 208/45, 251 R, 261.1, 188; 585/838, 833, 812; 507/921; 210/708

(56) References Cited

U.S. PATENT DOCUMENTS

| | | | |
|---|---|---|---|
| 2,446,040 A | | 7/1948 | Blair, Jr. ...................... 516/143 |
| 3,231,487 A | * | 1/1966 | Nettles ........................ 516/142 |
| 3,854,531 A | * | 12/1974 | Carlin ......................... 166/272 |
| 4,153,537 A | * | 5/1979 | Ross et al. ................... 208/177 |
| 4,228,002 A | * | 10/1980 | Vaidyanathan et al. . 208/251 R |
| 4,464,251 A | * | 8/1984 | Kukes et al. ............ 208/251 R |
| 4,634,520 A | * | 1/1987 | Angelov et al. ............. 208/188 |
| 5,100,582 A | | 3/1992 | Bhattacharyya ............. 516/186 |
| 5,135,655 A | * | 8/1992 | Cimino et al. ............... 210/774 |
| 5,460,750 A | | 10/1995 | Diaz-Arauzo ............... 516/183 |
| 5,525,201 A | | 6/1996 | Diaz-Arauzo et al. ...... 204/573 |
| 5,607,574 A | | 3/1997 | Hart ............................ 208/188 |
| 5,746,908 A | | 5/1998 | Mitchell .................. 208/251 R |
| 5,948,242 A | | 9/1999 | Obsol et al. ................. 208/181 |
| 6,001,245 A | * | 12/1999 | Reich et al. ................. 210/774 |
| 6,093,311 A | * | 7/2000 | Blum et al. ............. 208/251 R |
| 6,187,175 B1 | * | 2/2001 | Blum et al. ............. 208/251 R |
| 6,245,222 B1 | * | 6/2001 | Varadaraj et al. ....... 208/251 R |

FOREIGN PATENT DOCUMENTS

EP 0 314 223 A2 * 5/1989

OTHER PUBLICATIONS

Funk, "Separation of Heavy Oils Using Supercritical Fluids", Amer. Chem. Soc, Div. of Fuel Chem., vol. 30(3), Sep. 1985, pp. 148–153.*
Eckermann et al.; "Deasphaltization and Demetalling of Heavy Crude Oils" Chem. Eng. Technol. 13:258–264 (1990). Month Unknown.
Kassim et al.; "Near Critical Carbon Dioxide Fractionation of Crude Oil" Fuel Science and Technology Int'l. 71:2 207–215 (1989). Month Unknown.

Sayegh et al.; "Phase Behavior Properties of $CO_2$/Heavy Oil Mixtures for EOR Applications" SPE 20037, Society of Petroleum Engineers, 60$^{th}$ California Regional Meeting, Ventura California, Apr. 4–6, 1990.
Sayegh et al.; "Phase behavior and physical properties of Lindbergh heavy oil/ $CO_2$ mixtures" The Journal of Canadian Petroleum Technology 29:6 31–39 (Nov.–Dec. 1990).
Zaki et al.; "Polyoxyethylenated Bisphenol–A for Breaking Water–in–oil Emulsions" Polymers for Advanced Technologies 7:805–808 (1996). Month Unknown.
Zaki et al.; "De–emulsifiers for water–in–crude oil–emulsions" Tenside Surf. Det. 34:12–17 (1997). Month Unknown.
Burke et al., "Removal of Hydrocarbons from Oilfield Brines by Flocculation with Carbon Dioxide," Society of Petroleum Engineers, 21046: 457–465 (1991).**
Chierici et al., "$CO_2$–Enriched Natural Gas Injection into a Fractured, Heavy Oil Reservoir: The Ponte Dirillo Field Pilot, Italy," Agip S.p.A., San Donato Milanese, Italy, 265–278, date unknown.
Chung et al., "Measurements and Correlations of the Physical Properties of $CO_2$/Heavy–Crude–Oil Mixtures," SPE Reservoir Engineering, 822–828 (Aug. 1988).
Höcker et al., "Continuous Deasphalting of Heavy Petroleum Residues with Ethyl Acetate," Chem. Eng. Technol., 10: 125–131 (1987).**
Kantar et al., "Heavy Oil Recovery by $CO_2$ Application from Bati Raman Field, Turkey," Society of Petroleum Engineers, 11475: 271–276 (1983).**
Little, Chester Thomas, "Removal of Petroleum Hydrocarbons from Oil–Field Brines with Carbon Dioxide," Dissertation, The University of Texas at Austin (May 1990).
Reid et al., "Lick Creek Meakin Sand Unit Immiscible $CO_2$–Waterflood Project," Society of Petroleum Engineers, 9795: 335–339 (1981).*
Rojas et al., "Scaled Model Studies of Carbon Dioxide/Brine Injection Strategies for Heavy Oil Recovery from Thin Formations," The Journal of Canadian Petroleum Technology, 85–94 (Jan.–Feb. 1986).
Saner et al., "$CO_2$ Recovery of Heavy Oil: Wilmington Field Test," Journal of Petroleum Technology, 769–776 (Jul. 1986).

* cited by examiner

Primary Examiner—Daniel S. Metzmaier
(74) Attorney, Agent, or Firm—Myers Bigel Sibley & Sajovec

(57) ABSTRACT

A method of demulsifying a water-in-oil emulsion comprising an oil phase comprising asphaltenes and an aqueous phase is disclosed. The method comprises contacting a carbon dioxide containing fluid with the emulsion such that the carbon dioxide containing fluid enters the oil phase of the emulsion. The asphaltenes precipitate out of the emulsion and the emulsion destabilizes.

37 Claims, No Drawings

METHODS OF DEMULSIFYING EMULSIONS USING CARBON DIOXIDE

FIELD OF THE INVENTION

The invention generally relates to demulsifying processes, and more particularly demulsifying processes involving water-in-oil emulsions.

BACKGROUND OF THE INVENTION

Extensive efforts have been made towards breaking, i.e., destabilizing, water-in-oil emulsions, particularly water-in-crude oil emulsions. Crude oil is often found in a reservoir in association with gas and saline formation water. As a reservoir becomes depleted, a time is typically reached when water is coproduced with oil. The number of wells now producing water with crude oil present therein is steadily increasing. Typically these immiscible fluids are readily emulsified by the simultaneous action of shear and pressure drop at the well head, chokes, and valves.

It has long been recognized that the resulting water-in-oil emulsions can be remarkably stable. Moreover, it is understood that asphaltenes are the predominant stabilizer of water-in-oil emulsions produced during the production, transportation, and refining of crude oil. Currently, the primary means by which these emulsions are destabilized is through the addition of polymeric demulsifying chemicals, usually based on phenol formaldehyde resin chemistry, as well as other water-soluble polymers. See e.g., U.S. Pat. No. 5,100,582 to Bhattacharyya; U.S. Pat. Nos. 5,460,750 and 5,525,201 to Diaz-Arauzo, and U.S. Pat. No. 2,446,040 to Blair, Jr.; "*The Efficiency of Polyalkylenepolyamines formaldehyde ethoxylates as Demulsifiers for Water-in-Crude Oil Emulsions*", N. N. Zaki, Tensides Surfactants Detergents 34(1), pp. 12–17 (1997) and "*Polyoxyethylenated Bisphenol-A for Breaking Water-in-Oil Emulsions*", Zaki, N. N., Polymers for Advanced Technologies, 7, pp. 805–808 (1996). These resins, particularly, comb polymers, often possess alkylated phenol hydrophobic moieties and ethoxylated hydrophilic moieties. These materials may be disadvantageous in that they pose potential environmental risks since they are believed to be endocrine disrupters. Moreover, such materials are often very costly.

Other means of destabilizing asphaltene-stabilized water-in-oil emulsions include thermal pressurization and rapid depressurization (see e.g., U.S. Pat. No. 5,948,242 to Ohsol), along with electrostatic droplet shattering and coalescence (see e.g., U.S. Pat. Nos. 5,607,574 to Hart and U.S. Pat. No. 5,746,908 to Mitchell). These methods tend to focus on efforts at "cracking" or "disrupting" the rigid, viscoelastic film of asphaltenes which form around the water droplets. One disadvantage of these techniques relates to the reforming of water droplets due to re-adsorption of displaced or "disrupted" asphaltenic film fragments in shear fields.

There is a need in the art for methods of destabilizing water-in-oil emulsions which address the problems discussed above.

SUMMARY OF THE INVENTION

In one aspect, the invention provides a method of demulsifying a water-in-oil emulsion. The water-in-oil emulsion comprises an oil phase and an aqueous phase. The oil phase comprises asphaltenes. The method comprises contacting a carbon dioxide containing fluid with the emulsion such that the carbon dioxide containing fluid enters the oil phase of the emulsion. Advantageously, the asphaltenes precipitate out of the emulsion and the emulsion destabilizes.

In another aspect, the invention provides a composition of matter. The composition of matter comprises a water-in-oil emulsion comprising an oil phase and an aqueous phase, as well as a carbon dioxide containing fluid. The oil phase comprises asphaltenes. The carbon dioxide containing fluid enters the oil phase of the emulsion, such that the asphaltenes precipitate out of the emulsion and the emulsion destabilizes.

These and other aspects and advantages of the invention are set forth in detail herein.

DETAILED DESCRIPTION OF THE PREFERRED EMBODIMENTS

The present invention now will be described more fully hereinafter with reference to the accompanying specification and examples, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

In one aspect, the invention relates to a method of demulsifying a water-in-oil emulsion comprising an oil phase and an aqueous phase. The oil phase comprises asphaltenes. The method comprises contacting a carbon dioxide containing fluid with the emulsion such that the carbon dioxide containing fluid enters the oil phase of the emulsion, wherein the asphaltene precipitates out of the emulsion and the emulsion destabilizes. Although not intending to be bound by theory, it is believed that when the asphaltenes precipitate, they begin to flocculate and agglomerate from the oil phase. Additionally, it is believed that the carbon dioxide containing fluid diffuses into the oil phase of the emulsion to render the asphaltenes interfacially inactive, i.e., the state of the phase of the asphaltenes changes, such that the emulsion destabilizes.

For the purposes of the invention, the term "water-in-oil" emulsion has a meaning that is conventionally known in the art, and refers to an emulsion in which the oil phase is the continuous phase and the aqueous phase is the dispersed phase. In a preferred embodiment, the emulsion comprises at least about 20 percent by volume of the oil phase, and more preferably from about 20 to about 90 percent by volume of the oil phase. In another embodiment, the oil phase comprises from about 1 to about 10 volume percent of the aqueous phase, i.e., about 90 to 99 percent of the oil phase.

The oil phase which is present contains a number of hydrocarbon materials that are typically present in water-in-oil emulsions, the selection of which is known to those skilled in the art. In a preferred embodiment, the oil phase includes mineral oils, particularly in the form of petroleum oil or petroleum-derived oil (e.g., Petroleum Refinery Products). Petroleum oil preferably encompasses aliphatic or wax-base oil, aromatic or asphalt-base oil, or mixed base oil. Crude oil, particularly heavy or light oil is particularly preferred. The term "heavy oil" refers to crude oil having an API gravity less than 20 and a viscosity higher than 100 cp and up to 10,000 cp at 20° C. In a typical embodiment, heavy crude oil has a relatively high asphaltene content with a relatively low H/C ratio. The term "light oil" refers to crude oil having an API gravity higher than 20 and a viscosity less than 100 cp at 20° C. In a typical embodiment, light crude oil has a relatively low asphaltene content with a relatively high H/C ratio. See e.g., *The Chemistry and Technology of Petroleum*, 2$^{nd}$ Ed., James G. Speight, (1991), pp. 3–5. Preferred crude oils that are employed in the method of the invention includes, but is not limited to, Arab Berri, Hondo, and B6 crude oils.

For the purposes of the invention, the term "asphaltenes" is defined to be components of the high boiling point fraction of the crude oil which are composed of polynuclear aromatic hydrocarbons of molecular weights ranging from 500 to 2000 or greater and aggregate molecular weights of up to 20,000 joined by alkyl chains. See e.g., *Hawley's Condensed Chemical Dictionary*, 12$^{th}$ Ed., Richard J. Lewis, Sr., Editor, (1993), p. 101. Various amounts of asphaltenes may be present in the emulsion. For example, in a preferred embodiment, the emulsion may include from about 0.2 or 15 to about 25 or 30 percent (w/w) of asphaltenes. In another embodiment, the emulsion may include from about 25 to about 30 percent (w/w) of asphaltenes. In another embodiment, the emulsion may include greater than about 25 percent (w/w) of asphaltenes. It should be appreciated that other amounts are encompassed by the invention.

The aqueous phase includes water. For the purposes of the invention, the term "water" is to be broadly construed and may include, but not be limited to, deionized water, tap water, distilled water, or ground water, or combinations thereof. Preferably, the water is present in a crude oil system. The aqueous phase may include any number of different additives (e.g., scale inhibitors, corrosion inhibitors, $H_2S$ scavengers, and biocides), buffers, and the like, the selection being known to one skilled in the art.

In one embodiment, the aqueous phase may include at least one inorganic salt. Examples of inorganic salts include, without limitation, sodium chloride, calcium chloride, magnesium chloride, sodium carbonate, and magnesium sulfate. Mixtures thereof can also be used. The aqueous phase may contain various amounts inorganic salts. In a preferred embodiment, for example, the aqueous phase comprises from above about 0 to about 10 weight/volume percent.

For the purposes of the invention, carbon dioxide may be employed in the carbon dioxide-containing fluid in a liquid or supercritical phase. If liquid $CO_2$ is used, the temperature employed during the process is preferably below 31.04° C. If supercritical $CO_2$ is used, it is preferred that the phase be employed at high pressure above 1070 psi and temperature above 31.04° C. As used herein, the term "high pressure" generally refers to $CO_2$ having a pressure from about 1000 to about 4500 psi. In a preferred embodiment, the $CO_2$ is utilized in a "supercritical" phase. As used herein, "supercritical" means that a fluid medium is above its critical temperature and pressure, i.e., above 31.04° C. and above 1070 psi for $CO_2$. The thermodynamic properties of $CO_2$ are reported in Hyatt, *J. Org. Chem.* 49: 5097–5101 (1984); therein, it is stated that the critical temperature of $CO_2$ is 31.04° C.; thus the method of the present invention may be carried out at a temperature above 31.04° C. A preferred pressure of the carbon dioxide containing fluid ranges from about 1000 or about 3000 psi to about 4500 psi. A preferred temperature of the carbon dioxide fluid ranges from about 25° C. to about 70° C., more preferably from 50° C. to about 70° C., and most preferably from about 60° C. to about 70° C. In general, embodiments in which the temperature is 50° C. or higher are particularly preferred.

The method of the invention may take place over various time periods, the selection of which may be determined by a person who is skilled in the art. Preferably, the step of contacting the carbon dioxide containing fluid with the emulsion is carried out from about 5 minutes to about 24 hours, and more preferably from about 5 minutes to about 2 hours.

The carbon dioxide containing fluid may include other components such as, for example, co-solvents, surfactants, co-surfactants, buffers, rheology modifiers, biological agents, and viscosity reduction modifiers. Other components may be used in the carbon dioxide containing fluid, the selection of which may be determined by the skilled artisan.

A wide variety of co-solvents can be used. Exemplary co-solvents include, but are not limited to, n-pentane, hexanes, cyclohexane, n-heptane, methanol, ethanol, isopropanol, ethylene glycol, propylene glycol, methylisopropyl ketone, benzene, toluene, xylenes, terpenes, paraffins, and mixtures thereof.

The co-solvents may be used in various amounts. In a preferred embodiment, the carbon dioxide containing fluid preferably comprises from about 0.1 weight/volume percent to about 5 weight/volume percent of co-solvent based on the volume of the emulsion.

If desired, a surfactant can be used in the carbon dioxide containing fluid. These surfactants are known to those skilled in the art. Examples of suitable surfactants are set forth in U.S. Pat. Nos. 5,783,082; 5,589,105; 5,639,836; and 5,451,633 to DeSimone et al., the disclosures of which are incorporated herein by reference in their entirety. Preferably, the surfactant has a "$CO_2$-philic segment", i.e., a segment that has affinity for carbon dioxide. The "$CO_2$-philic segment" preferably contains a fluorine-containing segment, typically in the form of a fluoropolymer. In various preferred embodiments, the surfactants can also include a "$CO_2$-phobic" segment which is preferably covalently bonded to the $CO_2$-philic segment.

Exemplary $CO_2$-philic segments may include a fluorine-containing segment or a siloxane-containing segment. The fluorine-containing segment is typically a "fluoropolymer". As used herein, a "fluoropolymer" has its conventional meaning in the art and should also be understood to include low molecular weight oligomers, i.e., those which have a degree of polymerization greater than or equal to two. See generally Banks et al., *Organofluorine Compounds: Principals and Applications* (1994); see also *Fluorine-Containing Polymers*, 7 Encyclopedia of Polymer Science and Engineering 256 (H. Mark et al. Eds. 2d Ed. 1985). Exemplary fluoropolymers are formed from monomers which may include fluoroacrylate monomers such as 2-(N-ethylperfluorooctanesulfonamido) ethyl acrylate ("EtFOSEA"), 2-(N-ethylperfluorooctanesulfonamido) ethyl methacrylate ("EtFOSEMA"), 2-(N-methylperfluorooctanesulfonamido) ethyl acrylate ("MeFOSEA"), 2-(N-methylperfluorooctanesulfonamido) ethyl methacrylate ("MeFOSEMA"), 1,1'- dihydroperfluorooctyl acrylate ("FOA"), 1,1'-dihydroperfluorooctyl methacrylate ("FOMA"), 1,1',2,2'-tetrahydroperfluoroalkylacrylate ("TAN"), 1,1',2,2'-tetrahydro perfluoroalkylmethacryland other fluoromethacrylates ("TM"); fluorostyrene monomers such as α-fluorostyrene and 2,4,6-trifluoromethylstyrene; fluoroalkylene oxide monomers such as hexafluoropropylene oxide and perfluorocyclohexane oxide; fluoroolefins such as tetrafluoroethylene, vinylidine fluoride, and chlorotrifluoroethylene; and fluorinated alkyl vinyl ether monomers such as perfluoro(propyl vinyl ether) and perfluoro(methyl vinyl ether). Copolymers using the above monomers may also be employed. Exemplary siloxane-containing segments include alkyl, fluoroalkyl, and chloroalkyl siloxanes. More specifically, dimethyl siloxanes and polydimethylsiloxane materials are useful. Mixtures of any of the above may be used.

Exemplary $CO_2$-phobic segments may comprise common lipophilic, oleophilic, and aromatic polymers, as well as oligomers formed from monomers such as ethylene, α-olefins, styrenics, acrylates, methacrylates, ethylene and propylene oxides, isobutylene, vinyl alcohols, acrylic acid, methacrylic acid, and vinyl pyrrolidone. The $CO_2$-phobic segment may also comprise molecular units containing various functional groups such as amides; esters; sulfones; sulfonamides; imides; thiols; alcohols; dienes; diols; acids such as carboxylic, sulfonic, and phosphoric; salts of various acids; ethers; ketones; cyanos; amines; quaternary ammonium salts; and thiozoles.

In another aspect, the invention relates to a composition of matter. The composition of matter comprises an oil phase and an aqueous phase of a demulsified water-in-oil emulsion; and a carbon dioxide containing fluid. The carbon dioxide containing fluid entered the oil phase of a water-in-oil emulsion such that asphaltenes precipitate out of the oil phase of the emulsion and the emulsion destabilizes. The composition of matter preferably has an asphaltene content of no greater than 15 percent by weight, although may contain other asphaltene amounts as set forth in detail hereinabove. The features described in the composition of matter are set forth in greater detail hereinabove.

EXAMPLES

The invention will now be described in greater detail with respect to the examples. It should be understood that the examples are for the purposes of illustration, and in no way limit the invention that is described by the claims. In the examples, Arab Berri, Hondo, and B6 crude oils were used. These crude oils were selected due to their extensive use in oil refineries and because they represent a wide range of values with respect to gravity, resin, and asphaltene contents, along with emulsion-forming tendencies. General properties of these crude oils are set forth in the following table:

TABLE 1

General Properties of Crude Oils

| Crude | API Gravity | Denisity g/cc @ 60° F. | Den Visc CP @ 100° F. | Asphalt. Content (wt %) | Resin Content (wt %) |
|---|---|---|---|---|---|
| Arab Berri | 37.3 | 0.83827 | 4.39 | 0.79 | 3.24 |
| Hondo | 19.4 | 0.93771 | 363 | 14.81 | 20.52 |
| B6 | 19.8 | 0.93523 | 2030 | 13.11 | 12.04 |

The solvents used in the examples were HPLC grade supplied by Fischer Scientific of Houston, Tex.

Demulsification experiments were conducted in a 20-ml cylindrical shaped stainless steel high-pressure cell supplied with two sapphire windows. The cell has an inlet gas valve, an outlet gas valve supplied from HIP-Industries of Erie, Pa. connected to a pressure rupture disk. A pressure transducer (model OMEGA PX302-10KGV of Stamford, Conn.) is connected to a pressure readout (model OMEGA DP25-S). Heating was maintained using a thermal-tape and the temperature was probed by a K-type (Chrom-Alumel) thermocouple connected to a temperature controller model CN 77353-A2. Carbon dioxide was conveyed to the system by means of a digital syringe pump model ISCO 260D supplied from ISCO Inc. of Lincoln, Nebr. until the desired initial pressure was reached. The system was heated to the desired temperature (between 25° C. and 70° C.) at a constant heating rate of 2° C./min. For demulsification examples described below, the system was left at this temperature and water separation was observed through the sapphire window every hour for the first 6 hours and then after 24 hours. The system was cooled to ambient temperature then $CO_2$ was depressurized at a steady slow rate of 5 ml/min. The cell was opened and the separated water (if any) was removed by a syringe and conveyed into a graduated cylinder. Alternatively, it should be appreciated that the separated water may be drained through a liquid drain valve to a graduated cylinder.

Example 1

Model Oil Preparation

Asphaltenes were first precipitated from Hondo crude oil by n-heptane addition (40:1 n-heptane: crude oil). The asphaltenes were weighed to the nearest 0.1 mg in a 15 ml polypropylene (PP) vial. An amount of toluene was thereafter added. The vial was capped and shaken for 1 hour to solubilize the asphaltenes. An amount of n-heptane was then added and again the vial was capped and shaken for 1 hour. The percentage weight of asphaltenes in the heptane-toluene mixture was 3 weight percent. The ratio of heptane to toluene in this example was 50:50 by volume.

Example 2

Model Oil Preparation

Asphaltenes were prepared as set forth in Example 1 except that the ratio of heptane to toluene was 60:40.

Example 3

Model Oil Preparation

Asphaltenes were prepared as set forth in Example 1 except that the ratio of heptane to toluene was 70:30.

Examples 4–6

Crude Oil Preparations

Various crude oils (Arab Berri, Hondo and B6) were mixed thoroughly using a Harbil GQM high-speed paint mixer obtainable through Mountain Technology, Inc. of Idaho Springs, Colo. for 3 minutes. The oil samples were determined to be homogeneous.

Example 7–9

Emulsion Preparations 6 ml of deionized water, pH adjusted at 6 and containing 1 percent NaCI, was added to 4 ml of the model oils set forth in Examples 1–3. Each mixture was emulsified using an ultra-high speed Virtishear Cyclone IQ homogenizer sold by Virtis Company located in Gardner, N.Y. having a 6 mm rotor/stator configuration (gapwidth 0.127 mm). The homogenizer was employed for 2 minutes at the oil/water interface and for 1 minute at the bottom of the vial. Immediately after emulsification, the emulsion was transferred to 20 ml glass tubes capped with PTFE lined lids. Each emulsion was left for 24 hrs before it was demulsified by carbon dioxide. Due to the high stability of the prepared emulsions, no water separation was observed after the 24 hr period.

Examples 10–12

Emulsion Preparations

The emulsification procedure generally set forth in Examples 7–9 are carried out for the crude oil samples of Examples 4–6. For each sample, no water separation was observed after the 24 hour period.

Examples 13–18
Demulsification of the Prepared Emulsions

Each of the emulsions prepared in Examples 7–9 and 10–12 was transferred to a 20 ml cylindrical shaped stainless steel high-pressure cell described above.

For each emulsion, carbon dioxide was conveyed to the system by means of a digital syringe pump model ISCO 260D until the desired initial pressure was reached. The system was thereafter heated to the desired temperature (e.g., from about 25° C. to about 70° C.) at a constant heating rate of 2° C./minute. The system was left at this temperature and water separation was observed through the sapphire window every hour for the first 6 hours and then after 24 hours. The system was then cooled to ambient temperature and the carbon dioxide was depressurized at a steady slow rate of 5 ml/min. The cell was opened and the separated water (if any) was removed by a syringe and conveyed into a graduated cylinder.

Examples 19
Demulsification of Model Emulsion

An emulsion at 50° C. was exposed to carbon dioxide having an initial pressure 1500 psi. The oil phase of the emulsion contained a 70:30 heptane:toluene ratio and 3 percent Hondo asphaltenes. The water content was 60 v/v percent with a pH of 6 (1 percent NaCl content). The residence time was 24 hours. Complete breakdown of the emulsion was observed.

Example 20
Demulsification of Crude Oil Emulsion

An emulsion at 70° C. was exposed to carbon dioxide having an initial pressure 1500 psi. The oil phase contained Arab Berri crude oil. The water content was 60 v/v percent with a pH of 6 (1 percent NaCl content). The residence time was 24 hours. Complete breakdown of the emulsion was observed.

Example 21
Demulsification of Crude Oil Emulsion

The procedure according to Example 20 was employed except that B6 crude oil was used in place of Arab Berri crude oil. Complete breakdown of the emulsion was observed.

Example 22
Demulsification of Crude Oil Emulsion

The procedure according to Example 21 was employed except 5 v/v percent of toluene and 5 v/v percent of 2-propanol were used as co-solvents. Complete breakdown of the emulsion was observed.

The invention is illustrated by reference to the above embodiments. It should be appreciated however that the invention is not limited to these embodiments but is instead defined by the claims that follow.

What is claimed is:

1. A method of demulsifying a water-in-oil emulsion comprising an oil phase and an aqueous phase, the oil phase comprising crude oil including asphaltenes, said method comprising:

adding the emulsion into a pressurizable vessel;

contacting the emulsion with carbon dioxide containing fluid comprising liquid carbon dioxide or supercritical carbon dioxide such that the carbon dioxide containing fluid enters the oil phase of the emulsion, the emulsion comprising from about 20 to about 90 percent by volume of the oil phase and about 10 to about 80 percent of the aqueous phase, wherein the asphaltenes precipitate out of the emulsion and the emulsion demulsifies; and separating the aqueous phase from the oil phase such that the crude oil is recovered.

2. The method according to claim 1, wherein the carbon dioxide containing fluid contains a co-solvent.

3. The method according to claim 2, wherein the co-solvent is selected from the group consisting of n-pentane, hexanes, cyclohexane, n-heptane, methanol, ethanol, isopropanol, ethylene glycol, propylene glycol, methyl-isopropyl ketone, benzene, toluene, xylenes, terpenes, paraffins, and mixtures thereof.

4. The method according to claim 2, wherein the co-solvent is selected from the group consisting of n-heptane, toluene, and mixtures thereof.

5. The method according to claim 1, wherein the crude oil is a light crude oil.

6. The method according to claim 1, wherein the crude oil is a heavy crude oil.

7. The method according to claim 1, wherein the asphaltenes are present in an amount ranging from about 0.2 to about 25 percent (w/w).

8. The method according to claim 1, wherein said step of contacting the carbon dioxide containing fluid with the emulsion is carried out from about 30 minutes to about 24 hours.

9. The method according to claim 1, wherein the aqueous phase comprises at least one inorganic salt.

10. The method according to claim 9, wherein the inorganic salt is selected from the group consisting of sodium chloride, calcium chloride, magnesium chloride, sodium carbonate, magnesium sulfate, and mixtures thereof.

11. The method according to claim 9, wherein the inorganic salt has a concentration in the aqueous phase ranging from above about 0 to about 10 weight/volume percent.

12. A method of demulsifying a water-in-oil emulsion comprising an oil phase and an aqueous phase, the oil phase comprising crude oil including asphaltenes, said method comprising:

adding the emulsion into a pressurizable vessel;

contacting the emulsion with a fluid comprising supercritical carbon dioxide such that the fluid enters the oil phase of the emulsion, the emulsion comprising from about 20 to about 90 percent by volume of the oil phase and about 10 to about 80 percent of the aqueous phase, wherein the asphaltenes precipitate out of the emulsion and the emulsion demulsifies; and separating the aqueous phase from the oil phase such that the crude oil is recovered.

13. The method according to claim 12, wherein the carbon dioxide containing fluid contains a co-solvent.

14. The method according to claim 13, wherein the co-solvent is selected from the group consisting of methane, ethane, propane, ammonium-butane, n-pentane, hexanes, cyclohexane, n-heptane, methanol, ethanol, isopropanol, ethylene glycol, propylene glycol, methyl-isopropyl ketone, benzene, toluene, xylenes, terpenes, paraffins, and mixtures thereof.

15. The method according to claim 13, wherein the co-solvent is selected from the group consisting of n-heptane, toluene, and mixtures thereof.

16. The method according to claim 12, wherein the crude oil is a light crude oil.

17. The method according to claim 12, wherein the crude oil is a heavy crude oil.

18. The method according to claim 12, wherein said step of contacting the carbon dioxide containing fluid with the emulsion is carried out from about 30 minutes to about 24 hours.

19. The method according to claim 12, wherein the asphaltenes are present in an amount ranging from about 0.2 to about 25 percent (w/w).

20. The method according to claim 12, wherein the aqueous phase comprises at least one inorganic salt.

21. The method according to claim 20, wherein the inorganic salt is selected from the group consisting of sodium chloride, calcium chloride, magnesium chloride, sodium carbonate, magnesium sulfate, and mixtures thereof.

22. The method according to claim 12, wherein the inorganic salt has a concentration in the aqueous phase ranging from above about 0 to about 10 weight/volume percent.

23. A method of demulsifying a water-in-oil emulsion comprising an oil phase and an aqueous phase, the oil phase comprising crude oil including asphaltenes, said method comprising:

adding the emulsion into a pressurizable vessel;

contacting the emulsion with carbon dioxide containing fluid, wherein the pressure of the carbon dioxide containing fluid ranges from about 1000 psi to about 4500 psi, and the temperature of the carbon dioxide fluid ranges from about 25° C. to about 70° C., such that the carbon dioxide containing fluid enters the oil phase of the emulsion, the emulsion comprising from about 20 to about 90 percent by volume of the oil phase and about 10 to about 80 percent of the aqueous phase, wherein the asphaltenes precipitate out of the emulsion and the emulsion demulsifies; and separating the aqueous phase from the oil phase such that the crude oil is recovered.

24. The method according to claim 23, wherein the temperature of the carbon dioxide fluid ranges from 50° C. to about 70° C.

25. The method according to claim 23, wherein the temperature of the carbon dioxide fluid ranges from about 60° C. to about 70° C.

26. The method according to claim 23, wherein the pressure of the carbon dioxide fluid ranges from about 3000 psi to about 4500 psi.

27. The method according to claim 23, wherein the carbon dioxide containing fluid comprises supercritical carbon dioxide.

28. The method according to claim 23, wherein the carbon dioxide containing fluid contains a co-solvent.

29. The method according to claim 28, wherein the co-solvent is selected from the group consisting of n-pentane, hexanes, cyclohexane, n-heptane, methanol, ethanol, isopropanol, ethylene glycol, propylene glycol, methyl-isopropyl ketone, benzene, toluene, xylenes, terpenes, paraffins, and mixtures thereof.

30. The method according to claim 28, wherein the co-solvent is selected from the group consisting of n-heptane, toluene, and mixtures thereof.

31. The method according to claim 23, wherein the crude oil is a light crude oil.

32. The method according to claim 23, wherein the crude oil is a heavy crude oil.

33. The method according to claim 23, wherein the asphaltenes are present in an amount ranging from about 0.2 to about 25 percent (w/w).

34. The method according to claim 23, wherein said step of contacting the carbon dioxide containing fluid with the emulsion is carried out from about 30 minutes to about 24 hours.

35. The method according to claim 23, wherein the aqueous phase comprises at least one inorganic salt.

36. The method according to claim 35, wherein the inorganic salt is selected from the group consisting of sodium chloride, calcium chloride, magnesium chloride, sodium carbonate, magnesium sulfate, and mixtures thereof.

37. The method according to claim 35, wherein the inorganic salt has a concentration in the aqueous phase ranging from above about 0 to about 10 weight/volume percent.

* * * * *